Oct. 31, 1939.    A. KOVALOVSKY ET AL    2,178,120
FISHING REEL
Filed Jan. 31, 1938    2 Sheets-Sheet 2
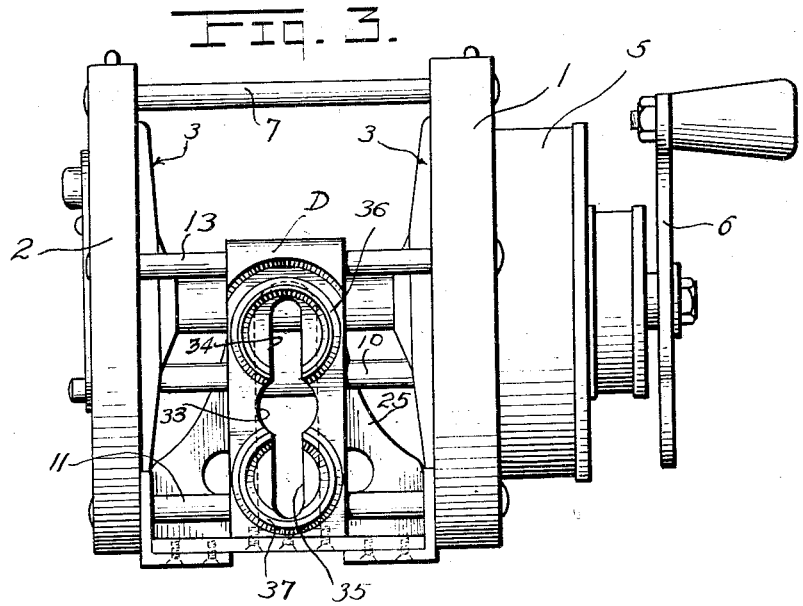
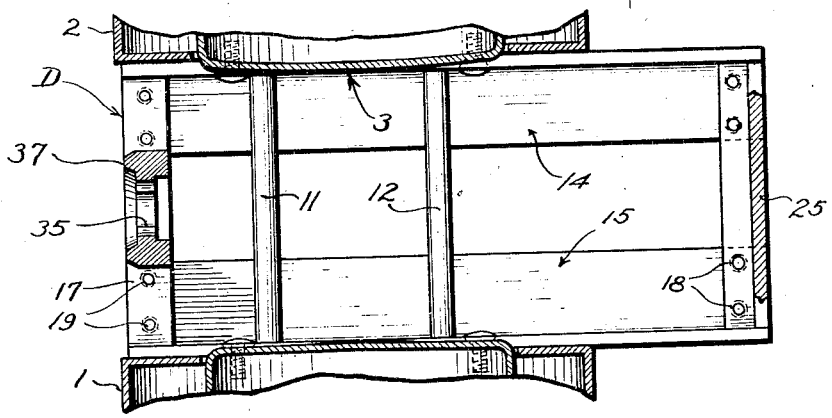
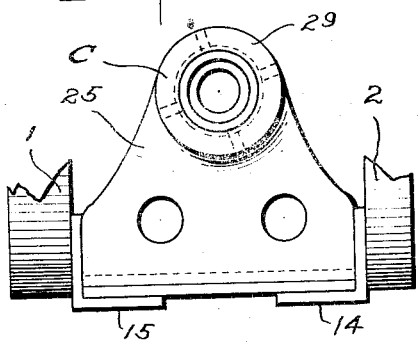
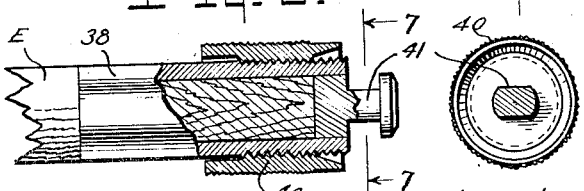
Inventor
Arthur Kovalovsky and Oscar Kovalovsky
by
Attorney.

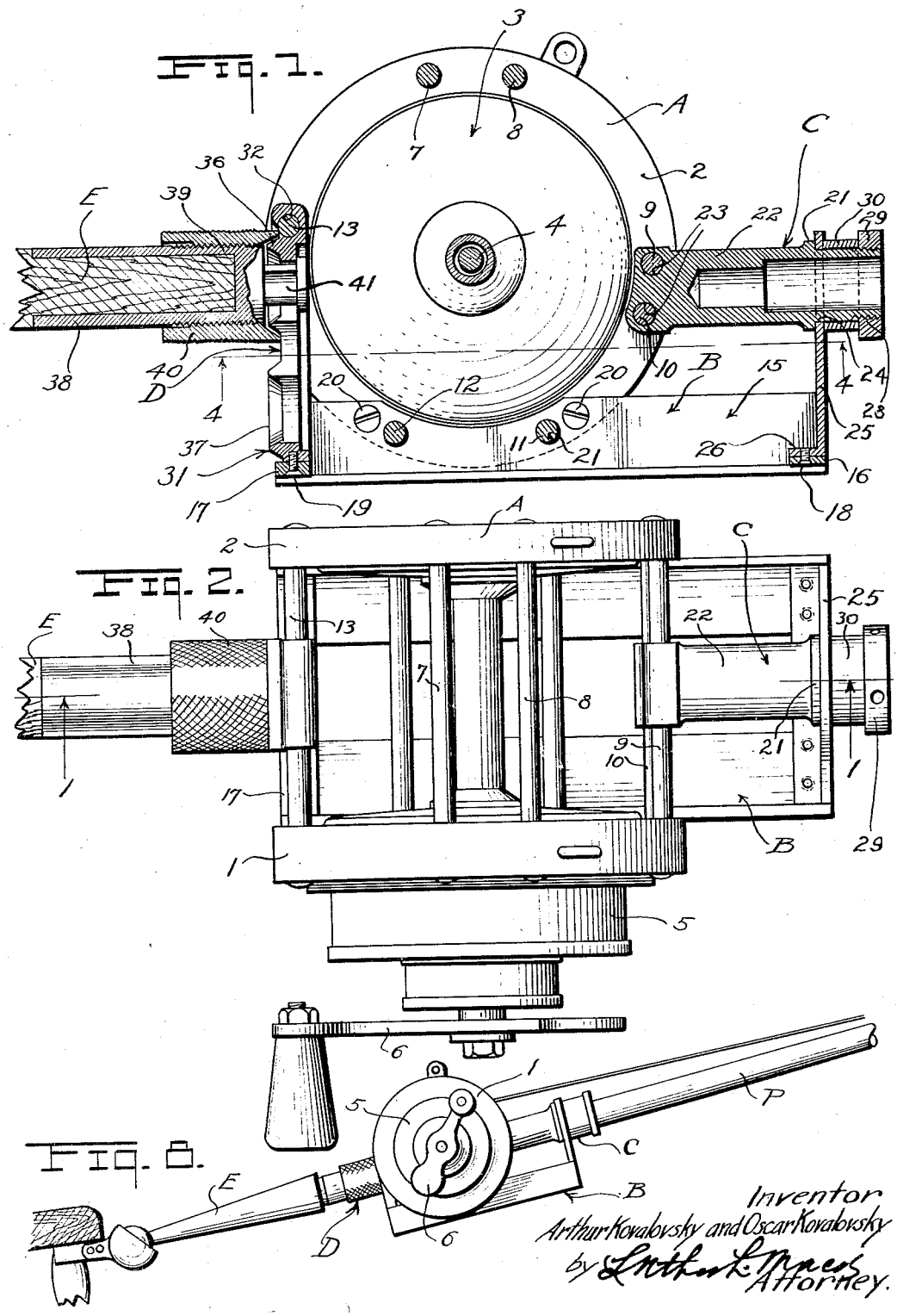

Patented Oct. 31, 1939

2,178,120

UNITED STATES PATENT OFFICE 2,178,120

FISHING REEL

Arthur Kovalovsky and Oscar Kovalovsky, Los Angeles, Calif.

Application January 31, 1938, Serial No. 187,917

9 Claims. (Cl. 43—20)

This invention relates to and has for an object the provision of an improved big game fishing reel which is provided with a cradle-like mounting for joining the reel with sections of a fishing pole in such manner that the axis of the reel is disposed substantially in or near the plane of the longitudinal axis of the pole, whereby to eliminate friction on the line and reduce the bulk on the upper side of the pole and provide for an easier manipulation of the pole by the fisherman.

A further object is to provide a fishing reel of the character described, which will afford a better balance in the pole and reel assembly, as well as add strength thereto, by reason of the reel constituting in effect, a section or joint portion of the pole, and because of the fact that only a portion of the reel extends above the plane of the axis of the pole as against the entire reel being above said plane, as is the common practice.

A further object is to provide a fishing reel of the character described, wherein the cradle for attaching the reel to the pole acts as an effective reinforcing means for the pole and reel assembly and serves as a convenient rest adapted to be placed upon a suitable support, without interfering with the operation of the reel.

A further object of this invention is to provide a fishing reel of the character described, wherein the cradle mounting, in so far as it relates to the butt section of the pole, provides for the mounting of said section either in alinement with the main part of the pole and substantially at the plane of the axis of the reel, or in a plane offset from that of the axis of the front part of the pole, for example, below said plane, at a point substantially coincident with the plane of the lower side of the cradle or otherwise.

We have shown a preferred form of our invention in the accompanying drawings, in which Fig. 1 represents a fragmentary longitudinal sectional view taken on the plane of line 1—1 of Fig. 2, and showing the reel constructed in accordance with this invention;

Fig. 2 represents a top plan view of the reel shown in Fig. 1;

Fig. 3 represents a rear elevation of the reel as when removed from the pole;

Fig. 4 represents a sectional view taken on the plane of line 4—4 of Fig. 1, with portions broken away and parts omitted for clarity of illustration;

Fig. 5 is a fragmentary front elevation of the lower part of the reel structure, particularly showing the cradle, the manner of mounting the same between the sides of the reel and frame, also the socket for the fore part of the pole;

Fig. 6 is a fragmentary sectional view partly in elevation, of the socket for the butt or lower section of the pole, as when removed from the reel;

Fig. 7 is a sectional view taken on the plane of line 7—7 of Fig. 6;

Fig. 8 represents a fragmentary side elevation of the reel as when mounted in a butt socket in readiness for use, the butt socket being mounted upon a chair.

Referring to the drawings, wherein a preferred embodiment of our fishing reel is shown in detail, the invention is seen to generally include a fishing reel A, a cradle B incorporated therewith, a socket means C connected with the reel and cradle and adapted to receive the pole P, and an attaching means D for securing the butt E of the pole in different positions with respect to the cradle and plane of the axis of the reel.

In accordance with this invention any suitable reel may be employed, although the invention deals primarily with reels of the big game type consisting of opposed sides 1 and 2 supporting the usual spool 3, the axis 4 of which latter is suitably journaled in said sides. On the side 1 of the reel is a housing 5 for a mechanism, not shown, for controlling the operation of the spool, said mechanism being operated by the usual crank 6. In reels of this type the sides 1 and 2 are joined by cross bars and in the present instance, seven of such bars are used and are designated as 7, 8, 9, 10, 11, 12 and 13. If desired, more or less of these cross bars may be used. As here shown, certain of said bars, such as the ones 9 to 13, inclusive, are employed to secure the cradle B to the reel structure.

The cradle B as here shown, comprises a substantially rectangular frame made up of spaced angle bars 14 and 15 which are of greater length than the diameter of the reel and extend from a point substantially flush with the rear side of the reel to a point well in front of the front side thereof. These bars are joined at their front and rear ends by flat cross bars 16 and 17 secured by means of threaded fastenings 18 and 19. The upstanding sides of the angle bars 14 and 15 are engaged with the opposed inner faces of the members 1 and 2 of the reel, and are secured thereto by means of the screws 20 and also by means of the cross members 11 and 12 which are extended through apertures 21 formed in said angle bars. It is thus seen that the cradle is longer than the fore and aft extent of the reel and has a width substantially equal to the space between the sides 1 and 2. This connection of the bars 14 and 15 with the reel, such that the lower sides thereof are below the plane of the lower side of the reel frames 1 and 2, whereby said bars will constitute a suitable rest for the reel and yet permit of free operation of the latter while the bars are rested upon a suitable support, not shown.

The socket means C for securing the pole P comprises a tubular socket 22, the inner end of which is provided with apertures 23 through which the cross bars 9 and 10 extend, whereby to securely fasten the socket to the reel proper. The socket may be constructed in any suitable manner so as to frictionally or otherwise hold the pole P in place when the latter is inserted therein. As here shown, said socket extends through an opening 24 in an upright plate 25 carried at the forward end of the cradle B. This plate has a foot 26 which lies upon the cross bar 16 and is secured thereto by means of the fastenings 18. A stop shoulder 21 on the socket abuts the rear face of the plate 25, whereas the free end of the socket extends forwardly of said plate and is externally screw threaded as at 28, whereby a nut 29 may be turned thereon to engage a spacer ring 30 and thereby hold the socket securely in place on the plate 25. It should be noted that the socket C is attached to the cradle and reel frame so that it will lie substantially in the plane of the axis of the reel, whereby the latter will be disposed substantially in the plane of the longitudinal axis of the pole.

The means D for securing the butt E of the pole comprising an upright plate 31, secured at its lower end upon the cross bar 17 by the fastenings 19 and held at its upper end by means of the cross bar 13 which passes through an aperture 32 therein. This plate is provided with a keyhole slot made of an enlarged central portion 33 and upper and lower extensions 34 and 35. Projecting rearwardly from and formed on the plate are annular bosses 36 and 37 having beveled outer faces. Other parts of the joint means D are carried by the butt E of the pole and include a ferrule 38 mounted on said butt and having a screw threaded outer end 39 adapted to receive a tubular nut 40. Projecting from the center of the outer end of the ferrule is a headed pin 41 which is adapted to be interlocked with the plate 31 when the pin is positioned in one of the slot portions 34 and 35 and the head thereof is engaged with the front face of said plate. As shown in Fig. 1, when the headed pin is in the upper slot 34 the butt may be secured to the reel by turning the tubular nut 40 so that it extends beyond the ferrule and telescopes the boss 36. Upon tightening this tubular nut a strong and tight joint is effected and the pole butt substantially alined with the pole proper and socket C. However, it is seen that the butt may be positioned in the lower slot 35 and secured thereto in the same manner as hereinbefore described, the reel remaining with its axis is substantially in a plane with the longitudinal axis of the pole.

It will now be seen that the reel of this invention, including the cradle and the means connected therewith and the reel proper for securing the pole to the reel, provide for an improved pole and reel assembly which may be quickly and easily set up and taken down, and wherein a better balance is afforded, as well as increased strength and ease of operation of the pole and reel.

Inasmuch as the majority of big game fishing reels are eight or more inches in diameter, it is seen that if such a reel is mounted as is customary, upon the upper side of a fishing pole, it will interfere with the operator bringing the pole upward to a vertical position close to the body, as is often required in successful fishing operations. By having the reel disposed with only a portion thereof extended above the plane of the axis of the pole, the aforesaid objection is eliminated, and not only is the pole and reel assembly thus made a better balanced unit, but the operator can manipulate the reel to greater advantage without being cramped, when the pole is in upright position and close to the operator. Furthermore, the angle of the line extending from the tip of the reel to the first guide on the pole is materially lessened, so as to eliminate friction and undue wear on the line.

It is also important to note that the cradle B permits of resting the pole and reel by placing the cradle on a support, and without interfering with the operation of the reel or the pole. Moreover, this provides for standing the reel in upright position when not in use, without damage to the reel.

We claim:

1. A fishing reel and pole assembly including a reel frame, a spool supported thereby, means for operating the spool, an elongated cradle secured to and having a substantially flat lower side disposed below the plane of the lower side of the reel frame when the reel is held with the axis of the spool in a substantially horizontal plane and means secured to said cradle and reel frame for attaching thereto sections of a sectional fishing pole with the axis of the reel spool disposed substantially in the plane of the longitudinal axis of the major portion of the pole, including members fixed to said reel frame and to the terminal of said cradle.

2. A fishing reel comprising a reel frame, a reel spool rotatable therein, means for rotating the spool, said frame including side members and cross bars joining said side members, a reel supporting cradle secured to and between said side members and having its lower side disposed below the plane of the lower side of said side members, certain of said cross bars extending through portions of said cradle, a fishing pole socket member extending forwardly from the front side of the reel and having an aperture therein through which one of said cross bars extends, an upstanding plate secured to said cradle and having an aperture therein through which said socket extends, means for securing said socket to said plate and means on the rear side of the reel secured thereto and to said cradle for joining thereto the butt section of the fishing pole.

3. A fishing reel comprising a reel frame, a reel spool rotatable therein, means for rotating the spool, said frame including side members and cross bars joining said side members, a reel supporting cradle secured to and between said side members and having its lower side disposed below the lower side of said side members, a fishing pole socket member extending forwardly from the front side of the reel and having an aperture therein through which one of said cross bars extends, an upstanding member secured to said cradle and having an aperture therein through which said socket extends, means for securing said socket to said upstanding member and means on the rear side of the reel secured thereto and to said cradle for joining thereto the butt section of the fishing pole.

4. A fishing reel comprising side members, cross bars joining said side members, a reel spool rotatably supported between said side members, means for rotating said spool, a frame having its lower side below said side members, said frame having apertures therein through which certain of said cross bars extend for securing the frame to the reel, upstanding members on the ends of said frame, and means associated with said upstanding members for attaching thereto sections of a sectional fishing pole.

5. A fishing reel comprising side members, a reel spool rotatably supported between said side members, means for rotating said spool, a frame having its lower side below said side members, means for connecting said frame with said side members, upstanding members on the ends of said frame, and means associated with said upstanding members for attaching thereto sections of a sectional fishing pole, said frame being longer than the fore and aft extent of the reel and substantially equal in width to the space between said side members.

6. A fishing reel comprising side members, a reel spool rotatably supported between said side members, means for rotating said spool, an elongated frame secured to and between said side members and having its lower side below the plane of said side members, upstanding members adjacent the ends of said frame, and means associated with said upstanding members and said side members for attaching thereto sections of a sectional fishing pole, said frame having the greater portion thereof extended forwardly of the axis of the reel.

7. A fishing reel comprising side members, cross bars joining said side members, a reel spool rotatably supported between said side members, means for rotating said spool, a substantially rectangular frame disposed between said side members, said frame having apertures therein through which certain of said cross bars extend for securing the frame to the reel, upstanding members on the ends of said frame, and means associated with said upstanding members for attaching thereto sections of a sectional fishing pole, the pole attaching means associated with the foremost upstanding member including a tubular socket member having a transverse opening adjacent its inner end through which one of said cross bars extends to secure said socket to the reel.

8. A fishing reel comprising side members, cross bars joining said side members, a reel spool rotatably supported between said side members, means for rotating said spool, a substantially rectangular frame disposed between said side members beneath said spool and having its lower side below the plane of the lower side of said side members, said frame having apertures therein through which certain of said cross bars extend for securing the frame to the reel, upstanding members on the ends of said frame, and means associated with said upstanding members for attaching thereto sections of a sectional fishing pole, the pole attaching means associated with the foremost upstanding member including a tubular socket member having a transverse opening adjacent its inner end through which one of said cross bars extends to secure said socket to the reel, said foremost upstanding member having an opening adjacent its upper end through which said socket member extends and means for securing said socket member in said last named opening.

9. A fishing reel comprising side members, cross bars joining said side members, a reel spool rotatably supported between said side members, means for rotating said spool, a frame disposed between said side members beneath said spool and having its lower side below the plane of the lower side of said side members, said frame having apertures therein through which certain of said cross bars extend for securing the frame to the reel, upstanding members on the ends of said frame, and means associated with said upstanding members for attaching thereto sections of a sectional fishing pole, said pole attaching means associated with the rearmost upstanding member including a headed projection adapted to be fixed to the butt section of the sectional pole, said rearmost upstanding member having a key-hole slot for the reception of said headed projection and a means for securing the projection within said slot.

ARTHUR KOVALOVSKY.
OSCAR KOVALOVSKY.